US007062479B2

(12) United States Patent
Edmunds et al.

(10) Patent No.: US 7,062,479 B2
(45) Date of Patent: Jun. 13, 2006

(54) CALCULATION ENGINE FOR USE IN OLAP ENVIRONMENTS

(75) Inventors: David Walter Edmunds, Orleans (CA); Robert Minns, Ottawa (CA); James Wallace Sinclair, Ottawa (CA)

(73) Assignee: Cognos Incorporated, Ottawa (CA)

( * ) Notice: Subject to any disclaimer, the term of this patent is extended or adjusted under 35 U.S.C. 154(b) by 303 days.

(21) Appl. No.: 10/016,262

(22) Filed: Nov. 2, 2001

(65) Prior Publication Data

US 2003/0088540 A1   May 8, 2003

(51) Int. Cl.
*G06F 17/30* (2006.01)
*G06F 7/00* (2006.01)
(52) U.S. Cl. ............... 707/1; 707/6; 707/4; 707/100
(58) Field of Classification Search .................. 707/1, 707/100, 4, 6
See application file for complete search history.

(56) References Cited

U.S. PATENT DOCUMENTS

| 5,276,607 | A |   | 1/1994 | Harris et al. |
| 5,897,629 | A | * | 4/1999 | Shinagawa et al. ........... 706/13 |
| 5,918,232 | A | * | 6/1999 | Pouschine et al. ........ 707/103 R |
| 5,978,796 | A | * | 11/1999 | Malloy et al. .................. 707/3 |
| 6,385,604 | B1 | * | 5/2002 | Bakalash et al. ............... 707/3 |
| 6,434,557 | B1 | * | 8/2002 | Egilsson et al. ............... 707/5 |
| 6,581,068 | B1 | * | 6/2003 | Bensoussan et al. ..... 707/104.1 |
| 6,622,137 | B1 | * | 9/2003 | Ravid et al. .................. 706/47 |
| 6,651,055 | B1 | * | 11/2003 | Kilmer et al. .................. 707/3 |
| 2002/0099692 | A1 | * | 7/2002 | Shah et al. .................... 707/2 |

FOREIGN PATENT DOCUMENTS

| EP | 0358492 | 3/1990 |
| WO | WO97/21176 | 6/1997 |
| WO | WO00/05658 | 2/2000 |

OTHER PUBLICATIONS http://web.archive.org/web/20011018140152/http://www.kem.ae.poznan.pl/Books/Excel-Solver/T1/T1.htm. Oct. 18, 2001.*
"An Introduction to Database Systems," by C.J. Date, 7th Edition, 2000, Chapter 21 Decision Support, pp. 694-729.
"CONTROL," by KCI Computing, Inc. of Torrance, CA.
"e.Planning," by Adaytum of Bloomington, MN.

* cited by examiner

*Primary Examiner*—Mohammad Ali
*Assistant Examiner*—Cindy Nguyen
(74) *Attorney, Agent, or Firm*—Shumaker & Sieffert, P.A.

(57) ABSTRACT

This invention addresses the need for dealing with complex planning calculations based on data warehouse or Planning Data Repository (PDR) data where some aggregated data or forecast data might be changed without directly manipulating the underlying data, and where there may be several relationships linking the data. The system is able to deal with complex relationships along more than one axis or dimension. A number of iterations are typically used involving both back-solving and 'forward-solving'. The subset of cells that needs to be recalculated is identified before steps of back-solving and/or forward-solving using parent/child tables. The scanning of these tables looking for potential dependencies is much simpler and faster than to looking at the actual formulae or functions relating the cells. The step of creating the parent/child tables is carried out in advance of the actual calculation by parsing all the relationships (formulae and functions) and summarising the dependencies between cells in the parent/child tables.

6 Claims, 5 Drawing Sheets

|  | Q1 | Q2 | Q3 | Q4 | Annual |
|---|---|---|---|---|---|
|  | 301 | 302 | 303 | 304 | 305 |
| 310 Quantity | Locked 320 | Back-solved Value R3 321 | Back-solved Value 322 | Back-solved Value 323 | Calculated Value R2 324 |
| 311 Price | Locked 330 | Locked 331 | Locked 332 | Back-solved Value 333 | Calculated Value R4 334 |
| 312 Sales (= Price * Quantity) | Calculated Value R3 340 | Calculated Value R3 341 | Calculated Value R3 342 | Calculated Value R3 343 | User estimate R1 344 |

R1: Annual Sales = Q1 sales + Q2 Sales + Q3 Sales + Q4 Sales
R2: Annual Quantity sold = Q1 Quantity + Q2 Quantity + Q3 Quantity + Q4 Quantity
R3: Quarterly Sales = Quarterly Quantity * Quarterly Price
R4: Assumed Price = Annual Sales/Annual Quantity.

FIG. 3

|  | 400 | 401 |
|---|---|---|
|  | Parent | Children |
| 410 | Annual forecast - Sales | Annual - Quantity, Annual - Price. |
| 411 | Annual forecast - Quantity  421 | Q1 - Quantity, Q2 - Quantity, Q3 - Quantity, Q4 - Quantity.  431 |
| 412 | Annual forecast - Revenue | Q1 - Sales, Q2 - Sales, Q3 - Sales, Q4 - Sales. |
| 413 | Q1 - Sales | Q1 - Quantity, Q1 - Price. |
| 414 | Q2 - Sales  423 | Q2 - Quantity, Q2 - Price.  433 |
| 415 | Q3 - Sales | Q3 - Quantity, Q3 - Price. |
| 416 | Q4 - Sales | Q4 - Quantity, Q4 - Price. |

FIG 4

|  | 500 Q1 | 502 Q2 | 504 Q3 | 506 Q4 | 508 Year |
|---|---|---|---|---|---|
| 510 Canada | 2.0 511 | 2.0 512 | 2.0 513 | 2.0 514 | 8.0 515 |
| 520 US | 2.0 521 | 2.0 522 | 2.0 523 | 2.0 524 | 8.0 525 |
| 530 North America | 4.0 531 | 4.0 532 | 4.0 533 | 4.0 534 | 16.0 535 |

FIG. 5

CALCULATION ENGINE FOR USE IN OLAP ENVIRONMENTS

The invention is in the field of data base and On-Line Analytical Processing (OLAP), particularly in the area of Decision Support Systems (DSS) used for corporate planning and forecasting.

BACKGROUND

Business planning applications, among them budgeting and forecasting, are increasingly being integrated into advanced data warehouse solutions in order to maximize the payback of the considerable investment in both the computing facilities and the gathering of the data they contain. Data warehousing enables a company to eliminate an extensive amount of workload generated by various reporting tasks. It also facilitates the standardization of data throughout the organization. The company-wide use of such applications results in improved internal communications and more efficient team work.

Recent advances in database computing have meant that automated enterprise-wide planning systems have become more prevalent. In the same way that electronic spreadsheets have transformed the management processes at a more detailed level, such enterprise-wide systems now allow many levels of management to interact to produce more accurate and timely forecasts for use in business planning. These systems, known as Decision Support Systems (DSS), typically make use of data warehouses wherein are stored historical data derived from the operations of the enterprise. In some cases other, often predicted, data are added to these historical data and the resultant augmented database is referred to in this document as a Planning Data Repository (PDR).

In dimensional modeling, a data warehouse contains different dimensions and a fact set related to the business structure. Each dimension represents a collection of unique entities that contribute to, and participate in, the fact set independent of entities from another dimension. The fact set also usually contains transactional data where each transaction is identified by a combination of entities, one from each dimension. Within a data warehouse, each dimension is a table where each record contains a key (or a composite key) to uniquely identify each entity and a list of attributes to qualify or describe the corresponding entity (or key). Each fact record in the fact table contains a foreign key to join to each dimension as well as a list of those measures representing the transactional data.

Multidimensional navigation and data analysis allow users the freedom to make effective use of the large quantity of data stored in a data warehouse. For example, sales performance may be viewed by company, division, department, salesperson, area, product or customer. Thus, the user can "turn the database cube" to view the information from a variety of desired angles or perspectives, first by department and then by area, for example. A 'drill-down' function allows the user to select a specific area (e.g. geographic) of interest and break it down further by product. Further drill-down on a specific product lets the user explore sales by period.

The above is more fully and clearly described in "An Introduction to Database Systems" by CJ Date, 7$^{th}$ Edition, 2000, Chapter 21 Decision Support, pp 694–729.

The deployment of wide area networks, in particular the world wide web (www) and its enterprise-wide equivalents, has resulted in the potential for revolutionary changes in the way enterprises do business, both with others and internally. For example, a primary advantage of a web-based budgeting application is that it permits and encourages direct participation in the budget setting process throughout an organization. Users can access the application from around the world, at the appropriate level of detail and security, allowing organizations to adapt quickly and to make rapid changes to their goals and strategies. Since all relevant employees participate directly in the budgeting process plans are developed using information from those who are actually involved in that area of the business. Users simply enter the data relevant to their function, and a calculation engine automatically generates the corresponding financial data after confirming its compatibility with other related data, and integrating it with that other data. This means that upper management can gain a better understanding of the business unit managers' forecasts and the assumptions underlying them.

Upper management is responsible for the strategic goals of the organization and must often explore the "what-if" scenarios. The business unit managers, on the other hand, are responsible for reaching these goals through revenue improvement, cost control, and resource allocation. Through web-based budgeting applications, upper management can set goals and priorities in the system to encourage the accomplishment of required objectives. As well, upper management can input standard rates or key planning assumptions such as salary grade levels, product prices, production capacity, inflation rates, and foreign exchange rates to ensure consistency throughout the plan. By a series of iterative steps business unit managers together with their upper management can develop a plan that is aligned with the strategic goals of the organization. Thus a web-based budgeting application bridges the gap between upper management and the business unit management.

In assessing the alternative strategies that might be used in the planning process, it is often useful to approach the problem using a 'what-if' technique, similar to that used in many spreadsheet programs. As part of that process, there is a need to ensure that any changes made to figures in higher-level overview plans are coordinated with, and reflected realistically in, their underlying forecast data and are consistent with those data. This process is generically known as 'back-solving' or 'goal-seeking'.

A Calculation Engine (CE) is a functional module used within a database application system to carry out more or less complex calculations on data extracted from the database. In general, as well as supporting the basic mathematical functions required to manipulate the data, a CE includes, or rather can be programmed with, sufficient rules and heuristics to deal with more complex situations requiring the selection of the more appropriate of alternate calculations.

In the past, the CE have been somewhat limited in their application to planning tools, particularly those based on historical data contained in a Planning Data Repository (PDR). This restriction largely stems from the size, complexity, and multi-dimensional nature of the data contained in the PDR.

More recent implementations of spreadsheets have added "solvers", "back-solvers", or "optimizers". These add goal-seeking functionality in which a user can reverse the "what-if" process. In this the user decides what value an output should assume, together with some constraining information, and the system determines appropriate input value(s). In a typical implementation, the user can set a target value at one cell, then specify both multiple input variables and multiple constraint cells. The optimizer finds all combinations of input values that achieve the target output without violating the constraints.

These back-solvers and optimizers are a good first step at improving the "what-if" process. The technique has been limited to electronic spreadsheet systems which have not been particularly effective in the process of actually managing very large data sets which result from enterprise-wide data warehousing technology.

The requirement of permitting several levels of rollup of forecasts, each using many (atomic) data, and incorporating, particularly at the higher levels, 'aggregated' data, led to the realisation that a more advanced calculation engine was required, melding the concepts of data warehouse-based enterprise-wide planning tools and DSS, with the "what-if" and "back-solving" capabilities exemplified by the electronic spreadsheet. This is described in a co-pending patent application "Improvements to computer-based business planning processes", Jim Sinclair, Marc Desbiens, Cognos Incorporated, Attorney/Agent Ref#08-886652, disclosure of which is incorporated herein by reference. Pertinent as aspects of this invention are reproduced here for convenience.

"Improvements to computer-based business planning processes" allows several users to manipulate complex data interactively, but separately, and then have the results of their inputs merged. Previous systems did not provide a means to allow a manager to selectively incorporate sub-plans produced by others (subordinates) in an interactive manner. It is based on hierarchical planning which matches typical business environments. The planning process is distributed over the management hierarchy and each level may contribute one or more alternative plans for consideration by a superior level. The distribution of the process is carried out using computer-enabled 'delegation'. The invention allows for the specification of relationships between a dimensional structure and a responsibility structure such that sub-plans and plans using the dimensional structure of the PDR may be partitioned into components corresponding to the responsibility structure. This specification defines an Organisation. Part of 'delegation' is the process of setting up the conditions, requirements, etc. for a subordinate to draft one or more sub-plans for their particular area. The subordinate then submits one or more of these sub-plans based on these conditions and information in the PDR, as well as on their specific experience and other (local) input. Such input may include submissions from subordinates obtained through this same delegation process. On 'submission', this sub-plan is able to be incorporated into higher level sub-plans (and ultimately into the master plan) ('accepted') or it might be returned to the subordinate for further work ('rejected') and potentially resubmitted. It is during this submission process that the second part to of 'delegation' takes place—the process of integrating sub-plans into a single plan, including ensuring overall consistency of the data, and conformance with any constraints defined by users. The process is iterative in nature, wherein information and planning data or forecasts, in the form of subordinate sub-plans contributed by others, are selectively incorporated in higher level plans. It is also re-entrant, in that the same process or set of processes may be used for successively higher and lower levels of planning.

A number of products address some of the calculation needs for planning tools for large enterprises. Examples are "CONTROL"[1] by KCI Computing, Inc. of Torrance, Calif., and "e.Planning"[2] by ADAYTUM of Bloomington, Minn. None of these products have the ability to allow significant complexity in more than one dimension, largely because of limitations in their ability to handle complex back-solving.

[1] Trade Mark of KCI Computing, Inc
[2] Trade Mark of ADAYTUM

SUMMARY

The present invention addresses the need for dealing with complex planning calculations based on data warehouse or Planning Data Repository (PDR) data where some aggregated data or forecast data might be changed without directly manipulating the underlying data, and where there may be several relationships linking the data.

In considering the various formulae and functions describing these relationships, the system is able to deal with complex relationships along more than one axis or dimension. A number of iterations are typically used involving both back-solving and 'forward-solving'. These relationships may be arbitrarily complex.

The advantage of the invention lies in the ability to identify, before a step of back-solving and/or forward-solving, the subset of cells that needs to be recalculated. This is done using parent/child tables which simply identify and record the fact that the value in a particular cell depends on a value in one or more other cells. Once such parent/child tables exist, it is much simpler and faster to scan these tables looking for potential dependencies than to look at the actual formulae or functions relating the cells. The result is that there is the potential for huge savings in computing resources required to reach a solution in those situations where the cubes are very large, since in general, the number of cells actually affected by a given set of relationships is much smaller than the number of cells in the cube. In practical terms, the expected savings are yielded, although in some extreme and rare cases where a change needs to be propagated throughout the entire cube, and the savings may not be as large.

In general, for large complex cubes, the step of creating the parent/child tables is carried out in advance of the actual calculation by parsing all the relationships (formulae and functions) and summarising the dependencies between cells in parent/child tables. For smaller, less complex cubes, the creating of the parent/child tables may be done only as required—on the fly so to speak. In all cases the parent/child tables are then available to determine later which calculations are required to be performed.

For each rule (equation/function) or relationship the system completes an 'inverse back-solve' for each cell of data affected by the rule in question.

An iteration is deemed complete when all changes to data have been applied, and all back-solves and related 'forward-solves' for those changes are complete, as well as all calculations done. Once an iteration is complete, the system goes on to the next if there are any outstanding changes.

The system might go through a number of interations to arrive at a solution, each iteration achieving a result closer to that desired, until the precision of the result is acceptable, or the error tolerable.

Redundant rules/equations are tolerated, so long as they are consistent. A redundant rule is one which states the same relationship between two or more variables as another rule but in a different way. For example:

Sales=Price*Quantity; and

Price=Sales/Quantity

In addition, some of the values and relationships can be 'locked' so that are not permitted to be altered during the data entry or solving phases.

An optimization of the system identifies which rules are not needed during a particular iteration or series of iterations. Each computed data item (parent) has one or more data items (children) which affect its value. For each parent a list is maintained of its children, and for each child a list is maintained of its parents. These lists can then be used to ascertain quickly whether a relationship must be checked when the value of a particular parent or child data item is varied. Since a simple lookup of the various lists can be performed with little resource utilisation, the number of calculations required can easily be minimised and the time taken to perform the process is usually short compared to that taken to perform all of the possible calculations for a given PDR.

BRIEF DESCRIPTION OF DRAWINGS

The invention will be described with reference to the following figures.

FIG. 3: A table to illustrate some basics of back-solving.

FIG. 4: An example of a table of relationships built during the use of the invention.

FIG. 5: A table illustrating the use of the invention.

DETAILED DESCRIPTION

Definitions

Figure 1:
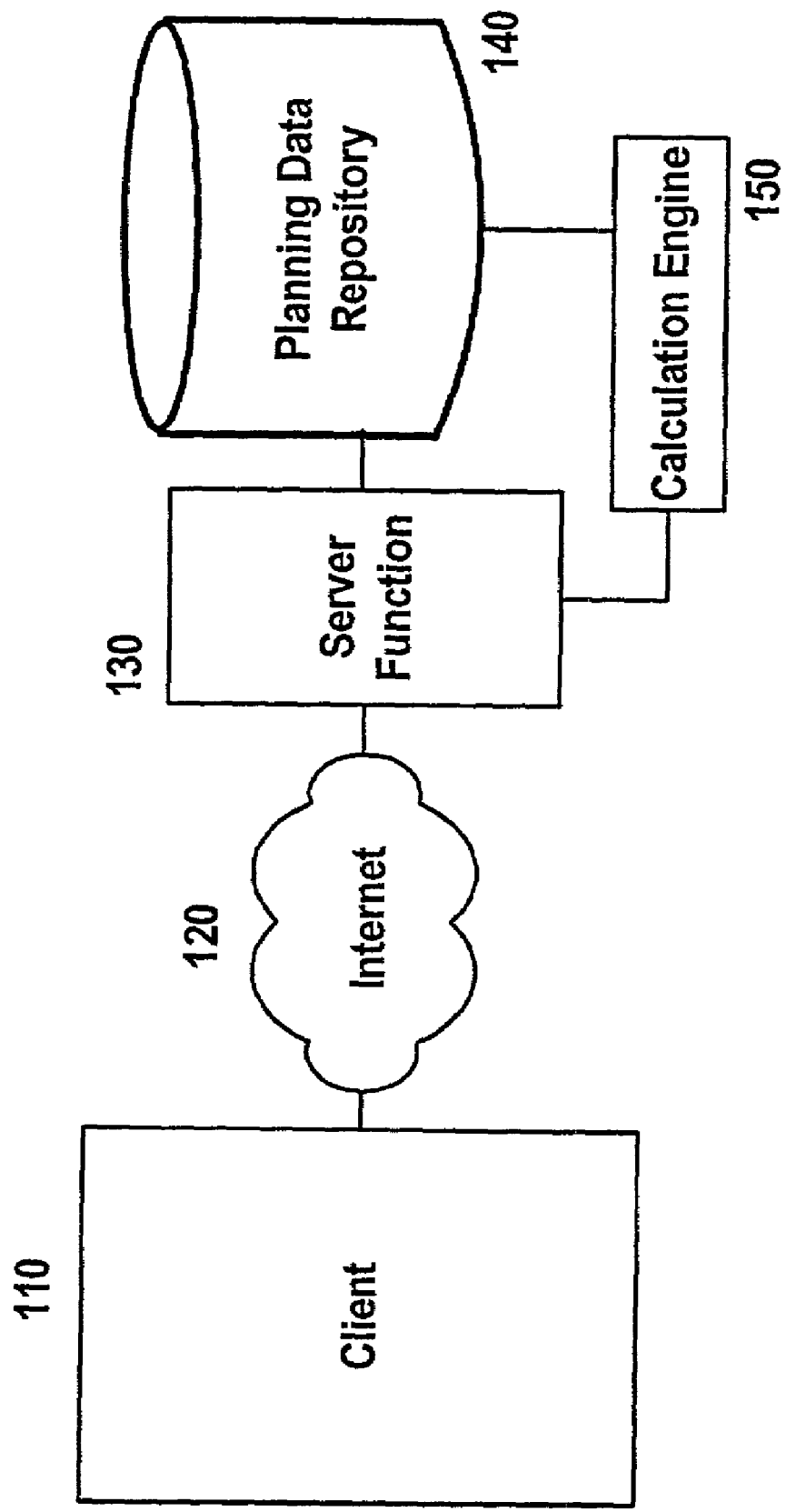
FIG. 1: A network diagram showing a typical environment

It is helpful to remind the reader of some basic definitions used in the art. The reader is cautioned that in some cases terms are almost synonymous, in other cases terms have evolved different meanings over time, and between different developers.

A plan: That which the enterprise uses to assist in determining the decisions for the future A sub-plan: A portion of a plan or sub-plan within the domain of a responsible manager.

A cube: A multi-dimensional set of data.

A sub-cube: A portion of a cube. When a sub-cube has been assigned to a responsible manager it becomes a sub-plan.

A cell: By analogy with a spreadsheet, this is the intersection of two or more dimensions, and contains, or 'references', values, formulae, constraints, rules, and other relationships.

Default value/constraint/function/attribute/etc.: The value/constraint/function/attribute/etc. assumed by the system when the user chooses not to provide (or vary) a cell value/constraint/function/attribute/etc.

Principles

The following guiding principles of planning are used in the Calculation Engine during the back-solving process:
  Mathematical correctness
  Fairness in apportioning changes across several variables
  Minimum change to data.

In addition to these principles, a number of other factors are taken into account during the calculation of the various iterations and cycles required to solve/back-solve a plan. These factors are explained below. These factors are included in the data schema for the PDR as constraints and relationships for each cell of the plan.

Prioritisation of Rules

Where more than one rule affects the contents of a cell such rules for applying functions to cell are subject to priorities. A set of prioritisation rules for dealing with how functions are applied to cells, and how the cells influence the result cells where there are 'competing' demands for fairness and correctness because of the complexity of relationships in multi-dimensional data, are important in ensuring the successful application of the invention.

However, each relationship for a cell is prioritized individually, and for a given cell the priorities may be adjusted by the user. Thus it is possible to create and store a rule for application to a single cell and have that rule take priority over default rule and any other rules by placing it first in the hierarchy of rules.

Parent/Child Relationships

The use of the parent/child relationships allows the application or system to determine the least amount of calculating needed to complete a particular iteration or back-solve. This is termed the 'lazy' approach, in that the system does not solve for a relationship unless it has to for a particular iteration. Further, when a solution has been calculated, the solution is remembered to avoid the need for recalculation during a particular iteration.

For each cell within a sub-cube, the CE determines first which equations apply, and second the parent/child relationships for that cell. The CE also takes into account any constraints to be applied, such as values 'locked for recalculation'. Any violation of such constraints causes the system to reject the sub-plan, and the user must make some change before resubmitting it. Such a change might simply be to remove a change previously requested.

Undo

A form of 'undo' command is available for the CE function, in that the CE retains in disk memory the original value of all cells altered during calculations, permitting them to be restored on command. The number of levels of 'undo' is therefore limited only by disk memory, but other limits might be imposed if desired.

Back-Solving

This includes both equation-solving (often called goal-seeking) and constrained optimization (using linear programming, nonlinear programming, and integer programming methods).

Equation-Solving: In the normal "what-if" operation of a CE, input values are entered or changed, and the CE computes the output values of various formulas which depend on those inputs. In back-solving the CE can be thought of as performing "what-if in reverse": output values are specified, or ranges of values certain formulas might be permitted to have, and the CE determines the input values which result in those output values. When the CE requires to find the input value which results in a specific formula output value, an equation is solved for an unknown (the input value). A CE can solve a set of simultaneous equations for several unknowns at once. The equations have the form $A1=B1$ where B1 is a formula involving one or more unknown data values.

Constrained Optimization: The CE can also find input values which satisfy of set of simultaneous equations and inequalities (involving $<$, $>$, $\leq$, or $\geq$). Generally this results in more than one satisfactory set of input values. This is called constrained optimization; the equations or inequalities are called constraints.

The input values to be found by the CE are simply data items containing numbers within the sub-plan. The constraints each consist of a function which calculates a formula, a relation (=, <, >, <= or >=), and another function which calculates a formula.

FIG. 1 shows a simple network in which the invention may be implemented. The calculation engine 150 is associated with a planning data repository 140, a general server function 130. These major functions are connected to a Client computer 110 over a general purpose communications network or Internet 120.

Figure 2:
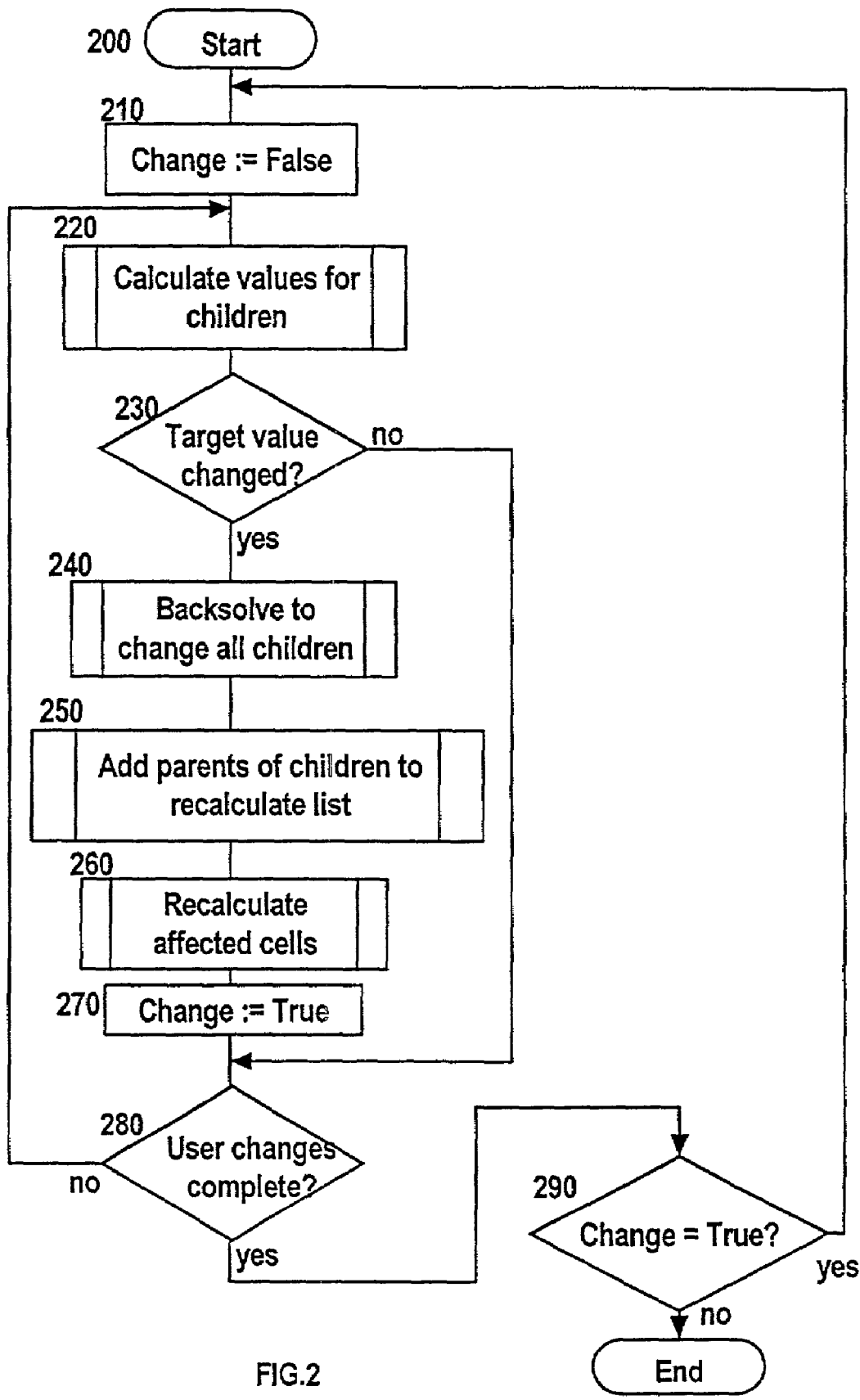
FIG. 2: A flowchart representation of part of the steps required to carry out the invention.

Part of the preferred embodiment of the method for performing the invention is given in the flowchart of FIG. 2. Prior to this part of the method being started, the required Parent/Child tables are constructed as described earlier. Once the method is started 200, a boolean flag is set to 'false' 210 to record that no changes have been performed. From the Parent/Child tables, the cells requiring calculation (the target cells) are determined, and the calculations performed if required 230. If a target cell is to be changed, then the back-solve is performed 240, all parents of the target (child) cells are remembered for recalculation 250, and any recalculations carried out 260. The change boolean is then set to 'true' 270. If a target value does not require change, then the boolean is unchanged. If all user changes are not yet complete 280, steps 220 to 270 are repeated as described earlier. If all user changes are complete 280, and changes have taken place 290, then steps 220 to 270 are repeated as described earlier. When all of the user changes have been processed 280, and the Change boolean has not been set to 'true' 290, the process is complete.

EXAMPLE OF BACK-SOLVING

A relatively simple example illustrates many of the attributes of a Decision Support System DSS and the resultant requirements for a calculation engine using the present invention. FIG. 3 is a table showing the derivation, state, and some constraints for actual and forecast sales figures for a single inventory item over four quarters and the year. Note that the data (in the cells) in the table are actually stored in the Planning Data Repository.

'Locked' values—Quantity for Q1 320, Prices for Q1 330, Q2 331, and Q3 332: These are values that cannot be changed during the current set of calculations. For this example the first quarter sales figures are locked as they cannot be changed since they reflect actual (historical) sales, and revenue. The price for the article has been arbitrarily fixed for the Q3 331 and Q4 332 for reasons outside the scope of this discussion.

User estimate—Annual Sales 344: These figures are those being forecast by the user or by other users. Figures forecasting the revenue for the last three quarters have previously been included in the table by the user or by other users.

Calculated values—Sales in Q1 340, Sales in Q2 341, Sales in Q3 342, Sales in Q4 343, Annual Sales Quantity 324, Annual Assumed Price 334: In this example, the calculations are simple: for each of the Quarterly columns Q1 301, Q2 302, Q3 303, and Q4 304, the respective Quantity and Price are multiplied to produce Sales. For the annual forecast column 305, the sales quantities for Q1 320, Q2 321, Q3 323, and Q4 324 and Sales revenue for Q1 330, Q2 331, Q3 332, and Q4 333 for each quarter are added, an Annual 'assumed Price' 334 can be calculated (Revenue/Quantity), and a final overall annual revenue forecast thereby produced.

Back-Solved values Sales quantity Q2 321, Q3 322, and Q4 323, and the Sale Price for Q4 333: These are values that must be changed as a direct result of altering a value in another part of the sub-plan. In this example a user might adjust the annual forecast Sales 344, in the course of determining potential strategies, perhaps to take account of factors not known by the originators of the more detailed quarterly forecasts. Although normally a 'Calculated' value it is possible to allow it to be changed, and then to alter its 'children' in order to make the calculation 'correct'. It is this step that is known as 'back-solving'.

Before any calculations and checks for parent/child relationships are undertaken the complete cube is checked for consistency. That is to say, all of the cells are checked that the rules are obeyed. The process of building parent/child relationship tables then starts by finding all of the parents for each cell for which a change is input. In turn, each of the parent cells is taken and its parents identified. This process is repeated until eventually all of the cells that may need to be changed as a result of the original change or changes are identified.

The necessity to perform a calculation is therefore dependent on the relationships between the various cells, and in some cases, there being no relationship relevant to cells being changed by the user, no calculations are required. In reducing the number of calculations, significant savings in computing requirements and time may be realised. In large arrays, the savings can be significant. The Parent/Child tables are the key to savings, where the user wishes to investigate the effect of changes which affect only a relatively small number of cells in a table. An example would be the requirement to make changes in the data for a multinational corporation which only affect the data relating to a single state. Again, the Parent/Child tables allow the calculation engine to minimise the number of calculations required. If the relationships are complex, and inter-related, the calculation engine may have to perform iterations which converge to a result. In some cases the complexity is such that resolution is impractical, either taking to many computing resources, or too long to perform. In this situation, the user may be required to simplify their request by reducing the number of changes, or the number and type of Parent/Child relationships, or the data relationships/formulae.

It is our observation that the use of the process described in this invention greatly speeds up the obtaining of results in decision support systems and other business planning applications using typical data warehousing or planning data repository (PDR) type operations. The magnitude of the savings is very dependent on the actual data, and the savings in each case must be assessed separately.

FIG. 3 also shows the various mathematical relationships between the values in various cells. In this example the relationships are simple, but they may be arbitrarily complex. In cases where the relationships are redundant they must be consistent with one another.

The FIG. 4 is a table summarising the relevant parent/child relationships for the data in FIG. 3. Each of the rows 410, 411, 412, 413, 414, 415, 416 shows, in the first column 400, the parent of a relationship, and, in the second column 401, the one or more children of that relationship.

It is worth noting that even in this simple case some of the children have 2 parents. As one example, the parents of the value 'Q2—Quantity' (which occurs in both cell 431 and cell 433 of the table) are 'Annual forecast—Quantity' 421 and 'Q2— Sales' 423. In more complicated scenarios, the number of parents for a single child has arbitrary limits. As the complexity of the table rises, the number of interactions between relationships rises, and therefore the complexity of the Calculation Engine required to solve the multi-dimensional problems increases. At some point the complexity will reach a point where the time taken to perform the various iterations and cycles becomes too long and the user becomes frustrated by the delay in achieving a result. In the end the complexity of such scenarios is limited largely by the time taken for the CE to complete its reaction to user input requests. There are no hard-and-fast rules. Where users appreciate and understand the underlying complexity of the PDR, and recognise the value of the planning processes enabled by the DSS, longer times will be tolerated. In simple cases, reaction times of the order of 2 seconds would be deemed too long, whereas for complex DSS in a multinational context, several tens of seconds may be acceptable. (In extreme cases, these times can even be extended, provided some indication of progress of the calculation is presented to the user.)

Further note that Children may have Parents which are Locked, and vice versa. The relationships are valid, but the locking makes it impossible to vary a value, which in turn may restrict the variation of the value in the dependent cell.

The creation of the Parent/Child relationship tables may take place in advance of any other calculation activity by the CE, or it may take place piece-wise so that the relationships for a given cell are computed just in advance of the actual calculation activity related to the cell in question. The decision as to whether to adopt the first or second approach depends on the size and complexity of the PDR, but generally the first approach is practical and effective for smaller systems, whereas the second, piece-wise approach is better for larger PDRs.

Following the guiding principles of the planning process (i.e. mathematical correctness, fairness, and minimum change to data), a set of prioritisation rules for applying functions to a cell is included as part of the data schema. However, each relationship for a cell is prioritized individually and for a given cell the priorities may be adjusted by the user. In addition to any default rules, it is possible to create and store a specific rule for application to a single cell and to have that rule take priority by placing it first in the hierarchy of rules for that cell. Such rules may also be set for rows or columns, or even for slices.

As can be seen, the relationships between the various cells, even in this relatively simple example, result in a complex process to ensure that all of the various principles outlined are followed, taking account of parent/child relationships.

For the example of FIGS. 3 and 4, the Calculation Engine applies known formulae (functions) to each of the other relevant values in the table in the following fashion:

First, the quarterly revenues 340, 341, 342, 343 for Q1–Q4 are re-calculated so that they meet the annual forecast as provided by the user as an estimate 344. This is done using some previously selected method to fairly apportion the change (e.g. proportionately across all values which are not Locked).

For each quarter Q1–Q4, 341, 342, 343, and 344, the non-locked values are then calculated. Obviously, for Q2 302 and Q3 303, the only value which can be changed is the quantity of items. For Q4 304, where both price 333 and quantity 323 values may be varied, some other function needs to be applied to apportion the value changes that are necessary to ensure the matrix remains mathematically correct.

For the Annual forecast column 305, the various values for quantity 324 and assumed price 334 are calculated as normal from the results of the previous actions to ensure overall consistency. If for some reason, such a calculation results in an inconsistency, then the other calculations are revisited, adjustments made to the 'Back-solved' values, and the Annual forecast column recalculated. This process continues until the error or difference is within limits specified by the user (or system defaults).

This example serves merely to illustrate the principles used in back-solving. The size and complexity of functions are not limited by the techniques, but rather by the overriding aspects of computing and storage capability.

The same basic approach is taken in the case of a more complex set of relationships in a large multi-dimensional situation.

A further simple model is shown in FIG. 5 to further illustrate the solve steps. It consists of a cube with two simple dimensions and two simple equations:

DIMENSION Location
MEMBER Location Canada
MEMBER Location US
MEMBER Location NorthAmerica $$NorthAmerica = Canada + US \qquad \text{EQUATION}$$

DIMENSION Time
MEMBER Time Q1
MEMBER Time Q2
MEMBER Time Q3
MEMBER Time Q4
MEMBER Time Year $$Year = Q1 + Q2 + Q3 + Q4 \qquad \text{EQUATION}$$

The initial state of the cube is shown in the table at FIG. 5. Next consider the two following examples.

Consider first the change of value of the cell NorthAmerica/Year 535 to 24.0. This might be called the 'worst case' because everything is affected by the NorthAmerica/Year total. Here are the steps to be followed, using simple distribution rules as necessary for any back-solves:

1) In order to change the value of NorthAmerica/Year to 24:
Change the value of NorthAmerica/Q1 531 to 6.0
Change the value of NorthAmerica/Q2 532 to 6.0
Change the value of NorthAmerica/Q3 533 to 6.0
Change the value of NorthAmerica/Q4 534 to 6.0

2) In order to change the value of NorthAmerica/Q1 531 to 6.0:
Change the value of Canada/Q1 511 to 3.0
Change the value of US/Q1 521 to 3.0

3) In order to change the value of Canada/Q1 511 to 3.0:
Canada/Q1 531 is an input field, change its value.
Since the value of Canada/Q1 511 has changed:
Recalculate Canada/Year 515
Recalculate NorthAmerica/Q1 531

4) In order to change US/Q1 521 to 3.0:
US/Q1 521 is an input field, change its value.
Since the value of US/Q1 521 has changed:
Recalculate US/Year 525
NorthAmerica/Q1 531, is not recalculated as it's already tagged for later recalculation.

5) Repeat steps 2, 3 and 4 for the Q2 502, Q3 503 and Q4 504 columns.

6) Recalculate all cells in the recalculation list and their parents and ancestors 7) The value of NorthAmerica/Year 535 is recalculated and now (hopefully) is set to the target value. If not, repeat steps 1 to 6.

The performance gains of using the parent/child table is evident if the change is more limited in scope as can be seen in the following example. The same initial cube is the same as for the first example, but this time the user requests a change for the value of Canada/Q1 511 be set to 4.0. In this case, the following steps will be performed:

1. In order to change the value of Canada/Q1 511 to 4.0 Canada/Q1 511 is an input field, so the value is changed. Since the value of Canada/Q1 511 has changed.
Recalculate the value of Canada/Year 515
Recalculate the value of NorthAmerica/Q1 531
2) Recalculate the value of Canada/Year 515
Recalculate the value of NorthAmerica/Year 535
3) Recalculate the value of NorthAmerica/Q1 531
4) Recalculate the value of NorthAmerica/Year 535

Since the system keeps track of the "parents" of a cell, the amount of recalculation that occurs when a value changes can be limited. In this case, recalculations are not needed for any cells related to columns Q2 502, Q3 504 or Q4 506, which accounts for more than half the cells in the cube. For a large complex cube, the savings from not recalculating unaffected cells is significant.

Although the description given is for a single computing system, those skilled in the art will recognise that the ideas, concepts and features of the invention may equally be applied in a multiple computing system, including one wherein the various computings systems interact over a network.

What is claimed is:

1. A method for calculating and back-solving of complex relationships in a planning data repository system comprising the steps of:
   a) generating a sub-cube from the planning data repository system using a Calculation Engine, said planning data repository system residing separately from the Calculation Engine;
   b) inputting from a user for at least one specified cell within the sub-cube, a required value, or a required value and one or more constraints, the required value and the constraints being taken into account by the Calculation Engine in calculations;
   c) where more than one calculation may affect a cell within the sub-cube, selecting a calculation for the affected cell in accordance with a set of prioritisation rules;
   d) creating one or more parent/child tables giving the relationships and dependencies between one or more target cells and other cells in the sub-cube, using the Calculation Engine;
   e) determining from the one or more parent/child tables the one or more target cells, each requiring a back-solving calculation to set a value of the specified cell to the required value;
   f) for each target cell:
      i) performing the back-solving calculation for the target cell using the Calculation Engine and recording that a change has taken place;
      ii) remembering the one or more parent cells of the target cell to ensure they are recalculated;
      iii) recalculating the value for each remembered parent cell using the Calculation Engine and recording that a change has taken place;
      iv) repeating the i) performing, ii) remembering, and iii) recalculating steps until all changes to the target cells and their parent cells are complete;
      v) repeating the i) performing, ii) remembering, iii) recalculating, and iv) first repeating steps until no changes are recorded; and
   g) reporting the results of the foregoing steps to the user.

2. The method of claim 1 wherein the parent/child table creating step d) is carried out as part of the performing the back-solving calculation step i), thereby reducing a number of access times to access a particular cell in smaller, less complex sub-cubes.

3. A system for calculating and back-solving complex relationships in a planning data repository system comprising:
   a) means for generating a sub-cube from the planning data repository system using a Calculation Engine, said planning data repository system residing separately from the Calculation Engine;
   b) means for inputting from a user for at least one specified cell within the sub-cube, a required value, or a required value and one or more constraints, the required value and the constraints being taken into account by the Calculation Engine in calculations;
   c) means for selecting a calculation for an affected cell within the sub-cube in accordance with a set of prioritisation rules;
   d) means for creating one or more parent/child tables giving the relationships and dependencies between one or more target cells and other cells in the sub-cube, using the Calculation Engine;
   e) means for determining from the one or more parent/child tables the one or more target cells, each target cell requiring a back-solving calculation to set a value of the specified cell to the required value;
   f) means for implementing the back-solving calculation for each target cell, including:
      i) means for performing the back-solving calculation for the target cell using the Calculation Engine and recording that a change has taken place;
      ii) means for remembering the one or more parent cells of said target cell to ensure they are recalculated;
      iii) means for recalculating the value for each remembered parent cell using the Calculation Engine and recording that a change has taken place; and
   g) means for reporting the results of the foregoing means to the user.

4. A computer program product for calculating and back-solving complex relationships in a planning data repository system the computer program product comprising a computer-readable storage medium having computer-readable program code means embodied in it, said computer readable program code means comprising:
   a) computer readable program code means for generating a sub-cube from the planning data repository system using a Calculation Engine, said planning data repository system residing separately from the Calculation Engine;
   b) computer readable program code means for inputting from a user for at least one specified cell within the sub-cube, a required value, or a required value and one or more constraints, the required value and the constraints being taken into account by the Calculation Engine in calculations;
   c) computer readable program code means for selecting a calculation for an affected cell within the sub-cube in accordance with a set of prioritisation rules;

d) computer readable program code means for creating one or more parent/child tables giving the relationships and dependencies between one or more target cells and other cells in the sub-cube, using the Calculation Engine;
e) computer readable program code means for determining from the one or more parent/child tables the one or more target cells each target cell requiring a back-solving calculation to set a value of the specified cell to the required value;
f) computer readable program code means for implementing the back-solving calculation for each target cell, including:
   i) computer readable program code means for performing the back-solving calculation for the target cell using the Calculation Engine and recording that a change has taken place;
   ii) computer readable program code means for remembering the one or more parent cells of said target cell to ensure they are recalculated;
   iii) computer readable program code means for recalculating the value for each remembered parent cell using the Calculation Engine and recording that a change has taken place; and
g) computer readable program code means for reporting the results of the foregoing means to the user.

5. The method of claim 1 wherein the step c) includes the step of accepting from a user an adjustment to the prioritisation rules.

6. The method of claim 1 including after step c) the step of:
   c1) checking the sub cube for consistency.

* * * * *